US008867755B2

(12) United States Patent
Nakadai et al.

(10) Patent No.: US 8,867,755 B2
(45) Date of Patent: Oct. 21, 2014

(54) SOUND SOURCE SEPARATION APPARATUS AND SOUND SOURCE SEPARATION METHOD

(75) Inventors: Kazuhiro Nakadai, Wako (JP); Hirofumi Nakajima, Wako (JP)

(73) Assignee: Honda Motor Co., Ltd., Tokyo (JP)

( * ) Notice: Subject to any disclaimer, the term of this patent is extended or adjusted under 35 U.S.C. 154(b) by 413 days.

(21) Appl. No.: 13/211,002

(22) Filed: Aug. 16, 2011

(65) Prior Publication Data

US 2012/0045066 A1 Feb. 23, 2012

Related U.S. Application Data

(60) Provisional application No. 61/374,382, filed on Aug. 17, 2010.

(51) Int. Cl.
*H04B 3/20* (2006.01)
*G10L 21/028* (2013.01)
*G10L 21/0216* (2013.01)

(52) U.S. Cl.
CPC ..... *G10L 21/028* (2013.01); *G10L 2021/02166* (2013.01)
USPC ................................ 381/66; 381/92; 704/233

(58) Field of Classification Search
USPC ............... 381/66, 83, 93, 94.1–94.3, 22, 122; 704/233, 226
See application file for complete search history.

(56) References Cited

U.S. PATENT DOCUMENTS

2006/0262865 A1 11/2006 Moran
2007/0133811 A1* 6/2007 Hashimoto et al. ............. 381/22
2008/0306739 A1* 12/2008 Nakajima et al. ............. 704/270

FOREIGN PATENT DOCUMENTS

JP 2007-215163 8/2007
JP 2007-295085 11/2007
JP 4444345 3/2010

OTHER PUBLICATIONS

Nakadai, Kazuhiro et al., "Sound Source Separation of Moving Speakers for Robot Audition," ICASSP 2009, IEEE International Conference on Acoustics, Speech and Signal Processing, pp. 3685-3688 (2009).
Nakajima, Hirofumi et al., "Adaptive Step-size Parameter Control for Real-world Blind Source Separation," ICASSP 2008, IEEE International Conference on Acoustics, Speech and Signal Processing, pp. 149-152 (2008).
Japanese Office Action for Application No. 2011-175396, 6 pages, dated Sep. 2, 2014.

* cited by examiner

*Primary Examiner* — Disler Paul
(74) *Attorney, Agent, or Firm* — Nelson Mullins Riley & Scarborough LLP; Anthony A. Laurentano

(57) ABSTRACT

A sound source separation apparatus includes a transfer function storage unit that stores a transfer function from a sound source, a sound change detection unit that generates change state information indicating a change of the sound source on the basis of an input signal input from a sound input unit, a parameter selection unit that calculates an initial separation matrix on the basis of the change state information generated by the sound change detection unit, and a sound source separation unit that separates the sound source from the input signal input from the sound input unit using the initial separation matrix calculated by the parameter selection unit.

6 Claims, 7 Drawing Sheets

FIG. 5

| SOUND SOURCE | | GSS (%) | AS (%) | AS·OCRA (%) |
|---|---|---|---|---|
| SINGLE | STATIONARY | 95.8 | 95.8 | 95.8 |
| | MOVING | 90.7 | 90.5 | 90.5 |
| TWO | STATIONARY | 58.3 | 72.3 | 73.1 |
| | MOVING | 60.2 | 72.9 | 74.4 |

FIG. 7

| TRANSFER FUNCTION D | SEPARATION MATRIX W | STATIONARY (%) | MOVING (%) |
|---|---|---|---|
| ID | ID | 90.8 | 67.9 |
| ID | POS | 94.1 | 66.7 |
| ID | ID_POS | 93.9 | 66.0 |
| POS | ID | 90.8 | 67.8 |
| POS | POS | 94.2 | 66.8 |
| POS | ID_POS | 93.9 | 63.2 |
| CALC | ID | 58.2 | 59.1 |

SOUND SOURCE SEPARATION APPARATUS AND SOUND SOURCE SEPARATION METHOD

CROSS REFERENCE TO RELATED APPLICATIONS

This application claims benefit from U.S. Provisional application Ser. No. 61/374,382, filed Aug. 17, 2010, the contents of which are incorporated herein by reference.

BACKGROUND OF THE INVENTION

1. Field of the Invention

The present invention relates to a sound source separation apparatus and a sound source separation method.

2. Description of Related Art

A blind source separation (BSS) technique of separating signals from observed signals in which plural unknown signal sequences are mixed has been proposed. The BSS technique is applied, for example, to sound recognition under noisy conditions. The BSS technique is used to separate sound uttered by a person from ambient noise, the driving sound made by a robot's movement, and the like.

In the BSS technique, spatial propagation characteristics from sound sources are used to separate signals.

For example, a sound source separation system described in Japanese Patent No. 4444345 is defined by a separation matrix indicating correlations between input signals and sound source signals, and a process is repeatedly performed of updating a current separation matrix into a subsequent separation matrix so that a subsequent value of a cost function for evaluating a degree of separation of the sound source signals is closer to the minimum value than to a current value thereof.

The degree of update of the separation matrix is adjusted to increase as the current value of the cost function increases and to decrease as rapidly as the current gradient of the cost function.

The sound source signals are separated with high precision on the basis of input signals to plural microphones and the optimal separation matrix.

SUMMARY OF THE INVENTION

However, in the sound source separation system described in Japanese Patent No. 4444345, when a sound source changes, the separation matrix noticeably changes. Accordingly, even when the separation matrix is updated, it cannot be said that the updated separation matrix approximates the optimal separation matrix. Therefore, there is a problem in that a sound source signal cannot be separated from the input signals using the separation matrix.

The invention is made in consideration of the above-mentioned problem and provides a sound source separation apparatus and a sound source separation method which can separate a sound source signal even when a sound source changes.

(1) According to a first aspect of the invention, there is provided a sound source separation apparatus including: a transfer function storage unit that stores a transfer function from a sound source; a sound change detection unit that generates change state information indicating a change of the sound source on the basis of an input signal input from a sound input unit; a parameter selection unit that calculates an initial separation matrix on the basis of the change state information generated by the sound change detection unit; and a sound source separation unit that separates the sound source from the input signal input from the sound input unit using the initial separation matrix calculated by the parameter selection unit.

(2) A sound source separation apparatus according to a second aspect of the invention is the sound source separation apparatus according to the first aspect, further including a transfer function storage unit that stores a transfer function from the sound source, wherein the parameter selection unit reads the transfer function from the transfer function storage unit and calculates the initial separation matrix using the read transfer function.

(3) A sound source separation apparatus according to a third aspect of the invention is the sound source separation apparatus according to the first aspect, wherein the sound change detection unit detects as the change state information that a sound source direction changes to be greater than a predetermined threshold and generates information indicating the change of the sound source direction.

(4) A sound source separation apparatus according to a fourth aspect of the invention is the sound source separation apparatus according to the first aspect, wherein the sound change detection unit detects as the change state information that the amplitude of the input signal changes to be greater than a predetermined threshold and generates information indicating that utterance has started.

(5) A sound source separation apparatus according to a fifth aspect of the invention is the sound source separation apparatus according to the first to fourth aspects, wherein the sound source separation unit updates the separation matrix using a cost function based on at least one of a separation sharpness indicating a degree of separation of a sound source from another sound source and a geometric constraint function indicating a magnitude of error between an output signal and a sound source signal as an index value.

(6) A sound source separation apparatus according to a sixth aspect of the invention is the sound source separation apparatus according to the fifth aspect, wherein the sound source separation unit uses a cost function obtained by weighted-summing the separation sharpness and the geometric constraint function as the cost function.

(7) According to a seventh aspect of the invention, there is provided a sound source separation method in a sound source separation apparatus having a transfer function storage unit storing a transfer function from a sound source, the sound source separation method including: causing the sound source separation apparatus to generate change state information indicating a change of the sound source on the basis of an input signal input from a sound input unit; causing the sound source separation apparatus to calculate an initial separation matrix on the basis of the generated change state information; and causing the sound source separation apparatus to separate the sound source from the input signal input from the sound input unit using the calculated initial separation matrix.

In the sound source separation apparatus according to the first aspect of the invention, since the initial separation matrix calculated on the basis of the change of the sound source is used to separate a sound source, it is possible to separate a sound signal in spite of the change of the sound source.

In the sound source separation apparatus according to the second aspect of the invention, since the initial separation matrix is calculated using the transfer function from the sound source, it is possible to separate a sound signal on the basis of the change of the transfer function.

In the sound source separation apparatus according to the third aspect of the invention, it is possible to set the initial separation matrix on the basis of the switching of sound source direction.

In the sound source separation apparatus according to the fourth aspect of the invention, it is possible to set the initial separation matrix on the basis of the start of utterance.

In the sound source separation apparatus according to the fifth aspect of the invention, it is possible to reduce the degree to which components based on different sound sources are mixed as a single sound source or a separation error.

In the sound source separation apparatus according to the sixth aspect of the invention, it is possible to reduce the degree to which components based on different sound sources are mixed as a single sound source and to reduce separation error.

In the sound source separation method according to the seventh aspect of the invention, since the initial separation matrix calculated using the transfer function read on the basis of the change of a sound source is used to separate the sound source, it is possible to separate a sound signal even when the sound source changes.

BRIEF DESCRIPTION OF THE DRAWINGS

FIG. 5 is a diagram illustrating a word correct rate according to the embodiment of the invention.

FIG. 7 is a diagram illustrating an example of word accuracy according to the embodiment of the invention.

DETAILED DESCRIPTION OF THE INVENTION

Hereinafter, an embodiment of the invention will be described with reference to the accompanying drawings.

Figure 1:
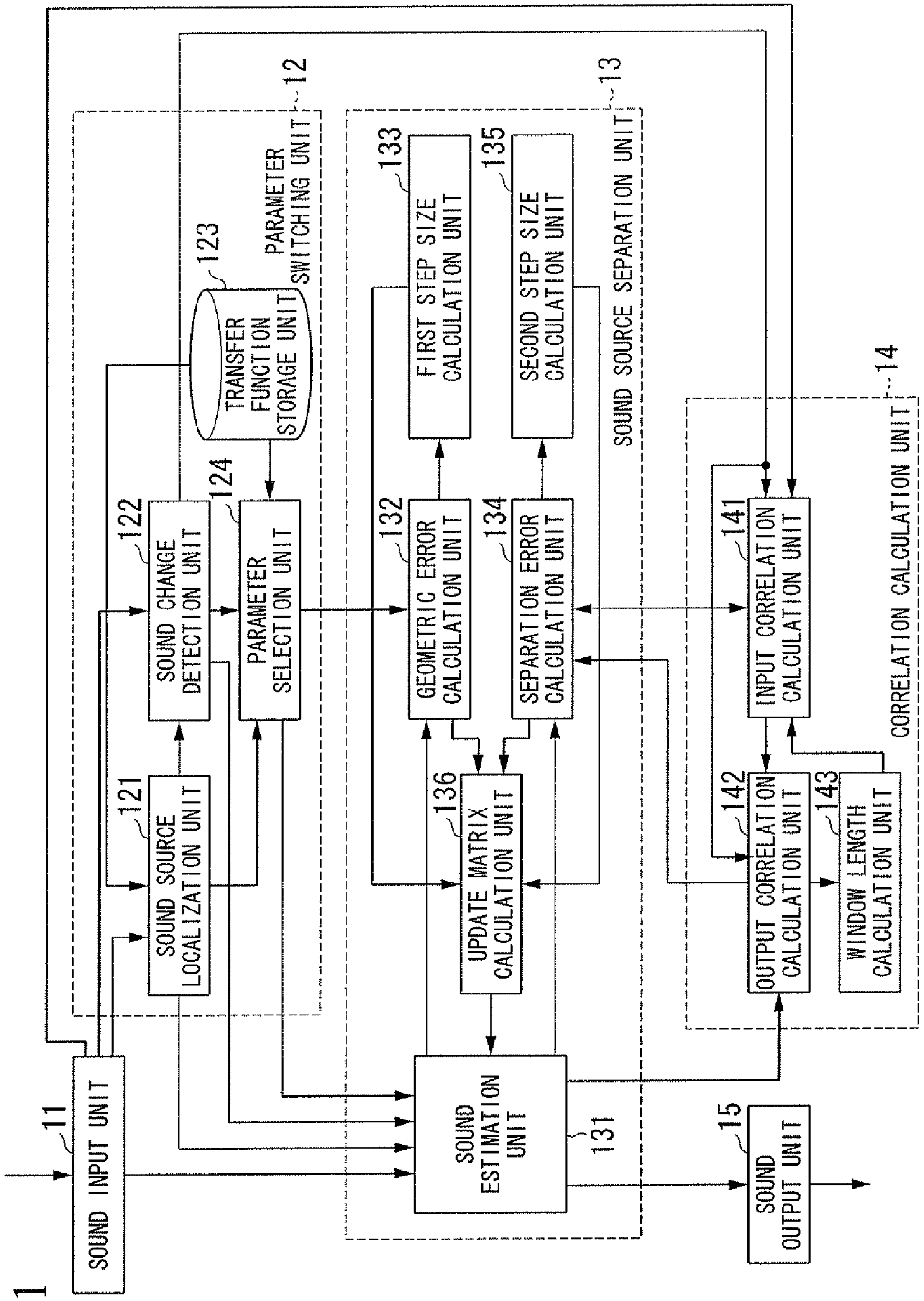
FIG. 1 is a conceptual diagram illustrating the configuration of a sound source separation apparatus according to an embodiment of the invention.

FIG. 1 is a diagram schematically illustrating the configuration of a sound source separation apparatus 1 according to an embodiment of the invention.

The sound source separation apparatus 1 includes a sound input unit 11, a parameter switching unit 12, a sound source separation unit 13, a correlation calculation unit 14, and a sound output unit 15.

The sound input unit 11 includes plural sound input elements (for example, microphones) that convert received sound waves into sound signals. The sound input elements are disposed at different positions. The sound input unit 11 is a microphone array including M (where M is an integer of 2 or greater) microphones.

The sound input unit 11 arranges and outputs the converted sound signals as a multichannel (for example, M-channel) sound signal to a sound source localization unit 121 and a sound change detection unit 122 of the parameter switching unit 12, a sound estimation unit 131 of the sound source separation unit 13, and an input correlation calculation unit 141 of the correlation calculation unit 14.

The parameter switching unit 12 estimates sound source directions on the basis of the multichannel sound signal input from the sound input unit 11 and detects changes of the estimated sound source directions for each frame (time). The change of the sound source directions includes, for example, switching of a sound source direction and utterance. The parameter switching unit 12 outputs a transfer function matrix including transfer functions corresponding to the detected sound source directions as elements and an initial separation matrix based on the transfer functions to the sound source separation unit 13. The transfer function matrix and the initial separation matrix will be described later.

The parameter switching unit 12 includes a sound source localization unit 121, a sound change detection unit 122, a transfer function storage unit 123, and a parameter selection unit 124.

The sound source localization unit 121 estimates the sound source directions on the basis of the multichannel sound signal input from the sound input unit 11. The sound source localization unit 121 uses, for example, a multiple signal classification (MUSIC) method to estimate the sound source directions. For example, when the MUSIC method is used, the sound source localization unit 121 performs the following processes.

The sound source localization unit 121 performs a discrete Fourier transform (DFT) on the sound signals of channels constituting the multichannel sound signal input from the sound input unit 11 for each frame to generate spectra in a frequency domain. Accordingly, the sound source localization unit 121 calculates an M-column input vector x having spectrum values of the channels as elements for each frequency. The sound source localization unit 121 calculates a spectrum correlation matrix $R_{sp}$ using Equation 1 on the basis of the calculated input vector x for each frequency.

$$R_{sp}=E[xx^*] \tag{1}$$

In Equation 1, * represents a complex conjugate transpose operator. E[xx*] is an operator indicating an expected value of xx*. An expected value is, for example, a temporal average over a predetermined time up to now.

The sound source localization unit 121 calculates an eigenvalue $\lambda_i$ and an eigenvector $e_i$ of the spectrum correlation matrix $R_{sp}$ so as to satisfy Equation 2.

$$R_{sp}e_i=\lambda_i e_i \tag{2}$$

The sound source localization unit 121 stores sets of the eigenvalue $\lambda_i$ and the eigenvector $e_i$ satisfying Equation 2. Here, i represents an index which is an integer equal to or greater than 1 and equal to or less than M. 1, 2, . . . and M of indices i are the descending order of the eigenvalues $\lambda_i$.

The sound source localization unit 121 calculates a spatial spectrum P(θ) using Equation 3 on the basis of the transfer function vector D(θ) selected from the transfer function storage unit 123.

$$P(\theta)=\frac{|D^*(\theta)D(\theta)|}{\sum_{i=N+1}^{K}|D^*(\theta)e_i|} \tag{3}$$

In Equation 3, |D*(θ)D(θ)| represents the absolute value of a scalar value D*(θ)D(θ). N represents the maximum number of recognizable sound sources and is a predetermined value (for example, 3). In this embodiment, N<M is preferable. K represents the number of eigenvectors $e_i$ stored in the sound source localization unit 121 and is a predetermined integer equal to or less than M. T represents the transposition of a vector or a matrix. That is, the eigenvector $e_i$ ($N+1\leq i\leq K$) is a vector value indicating the characteristics of components considered not to be a sound source. Therefore, the spatial spectrum P(θ) represents the ratio of the components other than a sound source to the components propagating from the sound source.

The sound source localization unit 121 acquires the spatial spectrum P(θ) in a predetermined frequency band using Equation 3. The predetermined frequency band is, for example, a frequency band in which a sound pressure based on a sound signal possible as a sound source is great and a sound pressure of noise is small. The frequency band is, for example, 0.5 to 2.8 kHz, when the sound source is a speech uttered by a person.

The sound source localization unit 121 extends the calculated spatial spectrum P(θ) in the frequency band to a band broader than the frequency band to calculate an extended spatial spectrum $P_{ext}(\theta)$.

Here, the sound source localization unit 121 calculates a signal-to-noise (S/N) ratio on the basis of the input multichannel sound signal and selects a frequency band ω in which the calculated S/N ratio is higher than a predetermined threshold (that is, noise is smaller).

The sound source localization unit 121 calculates the extended spatial spectrum $P_{ext}(\theta)$ by weighted-summing a square root of the maximum eigenvalue $\lambda_{max}$ out of the eigenvalues $\lambda_i$ calculated using Equation 2 in the selected frequency band ω and the spatial spectrum P(θ) using Equation 4.

$$P_{ext}(\theta) = \frac{1}{|\Omega|}\sum_{k\in\Omega}\sqrt{\lambda_{max}(\omega)}\,P_k(\theta) \tag{4}$$

In Equation 4, Ω represents a set of frequency bands, |Ω| represents the number of elements of the set Ω, and k represents an index indicating a frequency band. Accordingly, the characteristic of the frequency band ω in which the value of the spatial spectrum P(θ) is great is strongly reflected in the extended spatial spectrum $P_{ext}(\theta)$.

The sound source localization unit 121 selects the peak value (the local maximum value) of the extended spatial spectrum $P_{ext}(\theta)$ and a corresponding angle θ. The selected angle θ is estimated as a sound source direction.

The peak value means a value of the extended spatial spectrum $P_{ext}(\theta)$ at the angle θ which is greater than the value of the extended spatial spectrum $P_{ext}(\theta-\Delta\theta)$ at an angle θ−Δθ apart by a minute amount in a negative direction from the angle θ and the value of the extended spatial spectrum $P_{ext}(\theta+\Delta\theta)$ at an angle θ+Δθ apart by a minute amount in a positive direction from the angle θ. Δθ is a quantization width of the sound source direction θ and is, for example, 1° (degree).

The sound source localization unit 121 extracts the peak values of from the maximum value to the N-th maximum value out of the peak values of the extended spatial spectrum $P_{ext}(\theta)$ and selects the sound source directions θ corresponding to the extracted peak values. The sound source localization unit 121 determines sound source direction information indicating the selected sound source directions θ.

The sound source localization unit 121 may use, for example, a WDS-BF (weighted delay and sum beam forming) method instead of the MUSIC method to estimate the direction information for each sound source.

The sound source localization unit 121 outputs the determined sound source direction information to the sound change detection unit 122, the parameter selection unit 124, and the sound estimation unit 131 of the sound source separation unit 13.

The sound change detection unit 122 detects the change state of the sound sources on the basis of the multichannel sound signal input from the sound input unit 11 and the sound source direction information input from the sound source localization unit 121 and generates change state information indicating the detected change state. The sound change detection unit 122 outputs the generated change state information to the parameter selection unit 124, the sound estimation unit 131 of the sound source separation unit 13, and the input correlation calculation unit 141 and the output correlation calculation unit 142 of the correlation calculation unit 14.

The sound change detection unit 122 independently detects two states (1) and (2) as the change of a sound source for each frame: (1) switching of a sound source direction (hereinafter, also abbreviated as "POS") and (2) utterance (hereinafter, also referred to as "ID"). The sound change detection unit 122 may simultaneously detect the switching state of a sound source and the utterance state and may generate the change state information indicating both states.

The switching of a sound source direction means that a sound source direction instantaneously remarkably changes.

The sound change detection unit 122 detects the switching state of a sound source direction, for example, when the sound source direction at the current frame time and the sound source direction at the previous time a frame time ago as at least one sound source direction indicated by the sound source direction information are greater than a threshold $\theta_{th}$ (for example, 5°). At this time, the sound change detection unit 122 generates the change state information indicating the switching state of a sound source direction.

The utterance means that an onset state of a sound signal, that is, a state where the amplitude of a sound signal is greater than a predetermined amplitude or power, is started. In this embodiment, the utterance is not limited to the start of a person's utterance but may include the start of sound generation from objects such as musical instruments and devices.

The sound change detection unit 122 detects the utterance state, for example, when the power of a sound signal is uniformly smaller than a predetermined threshold $P_{th}$ (for example, 10 times the power of steady noise) from a previous time a predetermined number of frames ago (for example, the number of frames corresponding to 1 second) to the previous time a frame time ago and the current power of the sound signal is greater than the threshold $P_{th}$. At this time, the sound change detection unit 122 generates the change state information indicating the utterance state.

The transfer function storage unit 123 stores plural transfer function vectors in correspondence with the sound source direction information in advance. A transfer function vector is an M-column vector having transfer functions indicating the propagation characteristics of sound waves from a sound source to the sound input elements (channels) of the sound input unit 11 as elements. The transfer function vector the transfer function vector varies depending on the position (direction) of a sound source and varies depending on the frequency ω. In the transfer function storage unit 123, the sound source directions corresponding to the transfer functions are discretely arranged with a predetermined interval. For example, when the interval is 5°, 72 sets of transfer function vectors are stored in the transfer function storage unit 123.

The sound source direction information from the sound source localization unit 121 and the change state information from the sound change detection unit 122 are input to the parameter selection unit 124.

The parameter selection unit 124 reads a transfer function vector corresponding to the sound source direction information indicating the sound source directions closest to the sound source directions indicated by the input sound source direction information from the transfer function storage unit 123 when the input change state information indicates the switching state of a sound source direction or the utterance state. This is because the sound source direction information corresponding to the transfer function vectors stored in the transfer function storage unit 123 is not continuous values but discrete values.

When the sound source direction information indicates plural sound source directions, the parameter selection unit 124 combines the read transfer function vectors to construct a transfer function matrix. That is, the transfer function matrix is a matrix which has the transfer functions from the sound sources to the sound input elements as elements and which is determined for each frequency. When the sound source direction information indicates a single sound source direction, the parameter selection unit 124 sets the read transfer function vector as a transfer function matrix.

The parameter selection unit 124 outputs the transfer function matrix to the sound estimation unit 131 and the geometric error calculation unit 132 of the sound source separation unit 13.

The parameter selection unit 124 calculates an initial separation matrix which is an initial value of the separation matrix on the basis of the transfer function vectors corresponding to the sound source directions and outputs the calculated initial separation matrix to the sound estimation unit 131 of the sound source separation unit 13. The separation matrix will be described later. In this manner, the sound source separation unit 13 can initialize the transfer function matrix and the separation matrix at the time of the switching of the sound source direction or utterance.

The parameter selection unit 124 calculates the initial separation matrix $W_{init}$ on the basis of the transfer function matrix D using, for example, Equation 5.

$$W_{init}=[\mathrm{diag}[D^*D]]^{-1}D^* \tag{5}$$

In Equation 5, diag[D*D] represents a diagonal matrix having diagonal elements of the matrix D*D. $[D^*D]^{-1}$ represents an inverse matrix of the matrix D*D. For example, when D*D is a diagonal matrix of which all the off-diagonal elements are zero, the initial separation matrix $W_{init}$ is a pseudo-inverse matrix of the transfer function matrix D. When the number of sound sources is one, that is, when the matrix D is a vector in which the number of columns of the matrix D is one, the initial separation matrix $W_{init}$ is obtained by dividing the element values of the matrix D by the square sum thereof.

In this embodiment, the pseudo-inverse matrix $(D^*D)^{-1}D^*$ of the transfer function matrix D instead of the initial separation matrix $W_{init}$ calculated using Equation 5 may be calculated as the initial separation matrix $W_{init}$.

The sound source separation unit 13 estimates the separation matrix W, separates the components of the respective sound sources form the multichannel sound signal input from the sound input unit 11 on the basis of the estimated separation matrix W, and outputs the separated output spectrum (vector) to the sound output unit 15. The separation matrix W is a matrix having element values $w_{ij}$ which are multiplied by the i-th element of the spectrum x (vector) of the multichannel sound signal to calculate the contribution to the j-th element value of the output spectrum y (vector) as elements. When the sound source separation unit 13 estimates an ideal separation matrix W, the output spectrum y (vector) is equal to a sound source spectrum s (vector) having the spectra of the sound sources as elements.

The sound source separation unit 13 uses, for example, a geometric source separation (GSS) method to estimate the separation matrix W. The GSS method is a method of adaptively calculating the separation matrix W so as to minimize a cost function J obtained by summing a separation sharpness $J_{SS}$ and a geometric constraint $J_{GC}$.

The separation sharpness $J_{SS}$ is an index value expressed by Equation 6 and is a cost function used to calculate the separation matrix W using the BSS technique (BSS method).

$$J_{SS}(W)=|E(yy^H-\mathrm{diag}(yy^H))|^2 \tag{6}$$

In Equation 6, $|E(yy^H-\mathrm{diag}(yy^H))|^2$ is Forbenius norm of the matrix $E(yy^H-\mathrm{diag}(yy^H))$. The Forbenius norm means a square sum (scalar value) of the elements of a matrix. $E(yy^H-\mathrm{diag}(yy^H))$ is an expected value of the matrix $yy^H-\mathrm{diag}(yy^H)$, that is, a temporal average from a time a predetermined time ago to the current time. According to Equation 6, the separation sharpness $J_{SS}$ is an index value indicating the magnitudes of the off-diagonal elements of the output spectrum, that is, the degree to which a certain sound source is separated as another sound source. A matrix obtained by differentiating the separation sharpness $J_{SS}$ for each element value of the input spectrum x (vector) is an separation error matrix $J'_{SS}$. Here, in this differentiation, y=Wx is assumed.

The geometric constraint $J_{GC}$ is an index value expressed by Equation 7 and is a cost function used to calculate the separation matrix W using a beam forming (BF) method.

$$J_{GC}(W)=|\mathrm{diag}(WD-I)|^2 \tag{7}$$

According to Equation 7, the geometric constraint $J_{GC}$ is an index value indicating a degree of error between the output spectrum and the sound source spectrum. A matrix obtained by differentiating the geometric constraint $J_{GC}$ for each element value of the input spectrum x (vector) is a geometric error matrix $J'_{GC}$.

Therefore, the GSS method is an approach in which the BSS method and the BF method are combined and is a method which can improve both the separation precision of sound sources and the estimation precision of a sound spectrum.

When the GSS method is used, the sound source separation unit 13 includes the sound estimation unit 131, the geometric error calculation unit 132, the first step size calculation unit 133, the separation error calculation unit 134, the second step size calculation unit 135, and the update matrix calculation unit 136.

The sound estimation unit 131 calculates the separation matrix W for each frame time t using the initial separation matrix $W_{init}$ input from the parameter selection unit 124 as an initial value.

The sound estimation unit 131 subtracts an update matrix ΔW input from the update matrix calculation unit 136 from the separation matrix W at the current frame time t and calculates the separation matrix W at the subsequent frame time t+1. Accordingly, the sound estimation unit 131 updates the separation matrix W for each frame.

The sound estimation unit 131 stores the previously-calculated separation matrix W as the optimal separation matrix $W_{opt}$ in its own storage unit when the sound change information input from the sound change detection unit 122 indicates the switching of a sound source direction. The sound estimation unit 131 initializes the separation matrix W. At this time, the sound estimation unit 131 sets the initial separation matrix $W_{init}$ input from the parameter selection unit 124 as the separation matrix W.

The sound estimation unit 131 sets the optimal separation matrix $W_{opt}$ when the sound change information input from the sound change detection unit 122 indicates the utterance state. At this time, the sound estimation unit 131 reads the optimal separation matrix $W_{opt}$ corresponding to the sound source direction information input from the sound source localization unit 121 and sets the read optimal separation matrix $W_{opt}$ as the separation matrix W.

The sound estimation unit 131 may determine whether the change of the separation matrix W converges on the basis of the update matrix ΔW for each frame time. For this determination, the sound estimation unit 131 calculates an index value indicating the ratio of the magnitude (for example, norm) of the update matrix ΔW which is the variation of the separation matrix W and the magnitude of the separation matrix W. When the index value is smaller than a predetermined threshold (for example, 0.03 which corresponds to about −30 dB), the sound estimation unit 131 determines that the variation of the separation matrix W converges. When the index value is equal to or greater than the predetermined threshold, the sound estimation unit 131 determines that the variation of the separation matrix W does not converges.

When it is determined by the sound estimation unit 131 that the variation of the separation matrix W converges, the sound estimation unit 131 stores the sound source direction information input from the sound source localization unit 121 and the calculated separation matrix W as the optimal separation matrix $W_{opt}$ in its own storage unit in correspondence with each other.

When it is determined by the sound estimation unit 131 that the variation of the separation matrix W does not converge and the sound change information input from the sound change detection unit 122 indicates the switching of the sound source direction, the sound estimation unit 131 initializes the separation matrix W. At this time, the sound estimation unit 131 sets the initial separation matrix $W_{init}$ input from the parameter selection unit 124 as the separation matrix W.

When it is determined by the sound estimation unit 131 that the variation of the separation matrix W converges and the sound change information input from the sound change detection unit 122 indicates the switching of the sound source direction, the sound estimation unit 131 sets the optimal separation matrix $W_{opt}$. At this time, the sound estimation unit 131 reads the optimal separation matrix $W_{opt}$ corresponding to the sound source direction information input from the sound source localization unit 121 from the storage unit and sets the read optimal separation matrix $W_{opt}$ as the separation matrix W.

When it is determined by the sound estimation unit 131 that the variation of the separation matrix W does not converge and the sound change information input from the sound change detection unit 122 indicates the utterance state, the sound estimation unit 131 initializes the separation matrix W. At this time, the sound estimation unit 131 sets the initial separation matrix $W_{init}$ input from the parameter selection unit 124 as the separation matrix W.

When it is determined by the sound estimation unit 131 that the variation of the separation matrix W converges and the sound change information input from the sound change detection unit 122 indicates the utterance state, the sound estimation unit 131 sets the optimal separation matrix $W_{opt}$. At this time, the sound estimation unit 131 reads the optimal separation matrix $W_{opt}$ corresponding to the sound source direction information input from the sound source localization unit 121 from the storage unit and sets the read optimal separation matrix $W_{opt}$ as the separation matrix W.

When the sound change information input from the sound change detection unit 122 indicates both the switching of a sound source direction and the utterance state, the sound estimation unit 131 initializes the separation matrix W. At this time, the sound estimation unit 131 sets the initial separation matrix $W_{init}$ input from the parameter selection unit 124 as the separation matrix W. In this case, even when it is determined by the sound estimation unit 131 that the variation of the separation matrix W converges, the sound estimation unit 131 does not set the optimal separation matrix $W_{opt}$. When the switching of a sound source direction and the utterance state simultaneously occur, the transfer function from the sound source necessarily changes and thus the optimal separation matrix $W_{opt}$ varies.

The sound estimation unit 131 performs a discrete Fourier transform (DFT) on the sound signals of channels constituting the multichannel sound signal input from the sound input unit 11 for each frame to generate spectra in a frequency domain. Accordingly, the sound estimation unit 131 calculates an input vector x which is an M-column vector having spectrum values of the channels as elements for each frequency.

The sound estimation unit 131 multiplies the separation matrix W by the calculated input spectrum x (vector) and calculates the output spectrum y (vector) for each frequency. The sound estimation unit 131 outputs the output spectrum y to the sound output unit 15.

The sound estimation unit 131 outputs the calculated separation matrix W to the geometric error calculation unit 132, the separation error calculation unit 134, and the output correlation calculation unit 142 of the correlation calculation unit 14.

The geometric error calculation unit 132 calculates a geometric error matrix $J'_{GC}$ on the basis of the transfer function matrix D input from the parameter selection unit 124 and the separation matrix W input from the sound estimation unit 131 using, for example, Equation 8.

$$J'_{GC}=E_{GC}D^* \tag{8}$$

In Equation 8, the matrix $E_{GC}$ is a matrix obtained by subtracting a unit matrix I from the product of the separation matrix W and the transfer function matrix D, as expressed by Equation 9. The geometric error calculation unit 132 calculates the matrix $E_{GC}$ using Equation 9.

$$E_{GC}=WD-I \tag{9}$$

That is, the geometric error matrix $J'_{GC}$ is a matrix indicating the contribution to the estimation error of the separation matrix W among the errors between the output spectrum y from the sound estimation unit 131 and the sound source signal spectrum s.

The geometric error calculation unit 132 outputs the calculated geometric error matrix $J'_{GC}$ to the first step size calculation unit 133 and the update matrix calculation unit 136 and outputs the calculated matrix $E_{GC}$ to the first step size calculation unit 133.

The first step size calculation unit 133 calculates a first step size $\mu_{GC}$ on the basis of the matrix $E_{GC}$ and the geometric error matrix $J'_{GC}$ input from the geometric error calculation unit 132 using, for example, Equation 10.

$$\mu_{GC}=\frac{|E_{GC}|^2}{2|J'_{GC}|^2} \tag{10}$$

In Equation 10, the first step size $\mu_{GC}$ is a parameter indicating the ratio of the magnitude of the matrix $E_{GC}$ to the magnitude of the geometric error matrix $J'_{GC}$. In this manner, the first step size calculation unit 133 can adaptively calculate the first step size $\mu_{GC}$.

The first step size calculation unit 133 outputs the calculated first step size $\mu_{GC}$ to the update matrix calculation unit 136.

The separation error calculation unit 134 calculates a separation error matrix $J'_{SS}$ on the basis of the input correlation matrix $R_{xx}$ input from the input correlation calculation unit 141 of the correlation calculation unit 14, the output correlation matrix $R_{yy}$ input from the output correlation calculation unit 142, and the separation matrix W input from the sound estimation unit 131 using, for example, Equation 11.

$$J'_{SS}=2E_{SS}WR_{xx} \tag{11}$$

In Equation 11, the matrix ESS is a matrix indicating off-diagonal elements of the output correlation matrix $R_{yy}$, as expressed by Equation 12. The separation error calculation unit 134 calculates the matrix $E_{SS}$ using Equation 12.

$$E_{SS}=R_{yy}-\mathrm{diag}[R_{yy}] \tag{12}$$

That is, the separation error matrix $J'_{SS}$ is a matrix indicating the degree to which a sound signal from a certain sound source is mixed with a sound signal from another sound source when the sound signal propagates.

The separation error calculation unit 134 outputs the calculated separation error matrix $J'_{SS}$ to the second step size calculation unit 135 and the update matrix calculation unit 136 and outputs the calculated matrix $E_{SS}$ to the second step size calculation unit 135.

The second step size calculation unit 135 calculates a second step size $\mu_{SS}$ on the basis of the matrix $E_{SS}$ and the separation error matrix $J'_{SS}$ input from the separation error calculation unit 134 using, for example, Equation 13.

$$\mu_{SS}=\frac{|E_{SS}|^2}{2|J'_{SS}|^2} \tag{13}$$

That is, the second step size $\mu_{SS}$ is a parameter indicating the ratio of the magnitude of the matrix $E_{SS}$ to the magnitude of the separation error matrix $J'_{SS}$. In this manner, the second step size calculation unit 135 can adaptively calculate the second step size $\mu_{SS}$.

The second step size calculation unit 135 outputs the calculated second step size $\mu_{SS}$ to the update matrix calculation unit 136.

The geometric error matrix $J'_{GC}$ from the geometric error calculation unit 132 and the separation error matrix $J'_{SS}$ from the separation error calculation unit 134 are input to the update matrix calculation unit 136. The first step size $\mu_{GC}$ from the first step size calculation unit 133 and the second step size $\mu_{SS}$ from the second step size calculation unit 135 are input to the update matrix calculation unit 136.

The update matrix calculation unit 136 weighted-adds the geometric error matrix $J'_{GC}$ and the separation error matrix $J'_{SS}$ to the first step size $\mu_{GC}$ and the second step size $\mu_{SS}$ and calculates the update matrix ΔW for each frame. The update matrix calculation unit 136 outputs the calculated update matrix ΔW to the sound estimation unit 131.

In this manner, the sound source separation unit 13 sequentially calculates the separation matrix W on the basis of the GSS method.

In this embodiment, the sound source separation unit 13 may calculate the separation matrix W using the BSS method instead of the GSS method. In this case, the sound source separation unit 13 does not include the geometric error calculation unit 132 and the first step size calculation unit 133 and the update matrix calculation unit 136 sets the update matrix ΔW to $-\mu_{SS}J'_{SS}$.

In this embodiment, the sound source separation unit 13 may use the BF method instead of the GSS method. In this case, the sound source separation unit 13 does not include the separation error calculation unit 134 and the second step size calculation unit 135 and the update matrix calculation unit 136 sets the update matrix ΔW to $-\mu_{GC}J'_{GC}$.

The correlation calculation unit 14 calculates the input correlation matrix $R_{xx}$ on the basis of the multichannel sound signal input from the sound input unit 11 and calculates the output correlation matrix $R_{yy}$ further using the separation matrix W input from the sound source separation unit 13. The correlation calculation unit 14 outputs the calculated input correlation matrix $R_{xx}$ and the calculated output correlation matrix $R_{yy}$ to the separation error calculation unit 134.

The correlation calculation unit 14 includes the input correlation calculation unit 141, the output correlation calculation unit 142, and the window length calculation unit 143.

The input correlation calculation unit 141 calculates the input correlation matrix $R_{xx}(t_S)$ for each sampling time $t_S$ on the basis of the multichannel sound signal input from the sound input unit 11. The input correlation calculation unit 141 calculates a matrix, which has accumulated values of products of sampled values of the channels within the time $N(t_S)$ defined by a time window function $w(t_S)$ as elements, as an instantaneous value $R^{(i)}_{xx}(t_S)$ of the input correlation matrix, as expressed by Equation 14.

$$R^{(i)}_{xx}(t_S)=w(t_S)^*[x(t_S)x^*(t_S)] \tag{14}$$
$$=\sum_{\tau=0}^{\infty}w(\tau)[x(t_S-\tau)x^*(t_S-\tau)]$$

In Equation 14, τ represents a previous sampling time with respect to the current sampling time $t_S$. The time window function $w(t_S)$ is a function in which a value at the time between τ=0 and the sampling time the time $N(t_S)$ ago is set to 1 and a value at the time previous to $N(t_S)$ is set to 0. That is, the time window function $w(t_S)$ is a function of extracting signal values between τ=0 and $N(t_S)$. Here, the magnitude $N(t_S)$ of the interval at which the signal value is extracted is referred to as a window length. In this manner, the input correlation calculation unit 141 calculates the instantaneous value $R^{(i)}_{xx}(t_S)$ of the input correlation matrix in the time domain.

Therefore, the input correlation calculation unit 141 determines the time window function $w(t_S)$ on the basis of the window length $N(t_S)$ input from the window length calculation unit 143 and calculates the instantaneous value $R^{(i)}_{xx}(t_S)$ using Equation 14.

The input correlation calculation unit 141 weighted-sums the input correlation matrix $R_{xx}(t_S-1)$ at the previous sampling time $t_S-1$ and the instantaneous value $R^{(i)}_{xx}(t_S)$ at the current sampling time $t_S$ using an attenuation parameter $\alpha(t_S)$ and calculates the input correlation matrix $R_{xx}(t_S)$ at the current sampling time using, for example, Equation 15. The calculated input correlation matrix $R_{xx}(t_S)$ is a matrix having short-time average values.

$$R_{xx}(t_S)=\alpha(t_S)R_{xx}(t_S-1)+(1-\alpha(t_S))R^{(i)}_{xx}(t_S) \tag{15}$$

In Equation 15, the attenuation parameter $\alpha(t_S)$ is a coefficient indicating a degree to which the contribution of a previous value exponentially attenuates with the lapse of time. The input correlation calculation unit 141 calculates the attenuation parameter $\alpha'(t_S)$ on the basis of the window length $N(t_S)$ input from the window length calculation unit 143 using, for example, Equation 16.

$$\alpha(t_S)=(N(t_S)-1)/(N(t_S)+1) \tag{16}$$

According to the attenuation parameter $\alpha(t_S)$ calculated using Equation 16, the time range of the instantaneous value $R^{(i)}_{xx}(t_S)$ influencing the current input correlation matrix $R_{xx}(t_S)$ is substantially equal to the window length $N(t_S)$.

The input correlation calculation unit 141 performs the discrete Fourier transport on the input correlation matrix $R_{xx}(t)$ in the time domain for each frame to calculate the input correlation matrix $R_{xx}$ in the frequency domain for each frame time.

The input correlation calculation unit 141 sets the initial input correlation matrix $R_{xx}$ to a unit matrix, when the change state information indicating the switching state of a sound source or the change state information indicating the utterance state is input from the sound change detection unit 122.

The input correlation calculation unit 141 outputs the calculated or set input correlation matrix $R_{xx}$ to the separation error calculation unit 134 and outputs the input correlation matrix $R_{xx}(t_S)$ in the time domain to the output correlation calculation unit 142.

The output correlation calculation unit 142 calculates the output correlation matrix $R_{yy}(t_S)$ on the basis of the input correlation matrix $R_{xx}(t_S)$ in the time domain input from the input correlation calculation unit 141 and the separation matrix W input from the sound estimation unit 131.

The output correlation calculation unit 142 performs an inverse discrete Fourier transform on the separation matrix W input from the sound estimation unit 131 to calculate the separation matrix $w(t_S)$ in the time domain.

The output correlation calculation unit 142 multiplies the left side of the input correlation matrix $R_{xx}(t_S)$ by the separation matrix $w(t_S)$ and multiplies the right side thereof by the complex conjugate transpose matrix $w^*(t_S)$ of the separation matrix to calculate the output correlation matrix $R_{yy}(t_S)$ in the time domain as, for example, expressed by Equation 17.

$$R_{yy}(t_S)=W(t_S)R_{xx}(t_S)W^*(t_S) \quad (17)$$

The output correlation calculation unit 142 performs the discrete Fourier transform on the calculated output correlation matrix $R_{yy}(t_S)$ in the time domain for each frame time to calculate the output correlation matrix $R_{yy}$ in the frequency domain.

The output correlation calculation unit 142 may calculate the output correlation matrix $R_{yy}$ in the frequency domain on the basis of the output spectrum y input from the sound estimation unit 131 without using Equation 17 and may perform the inverse discrete Fourier transform on the output correlation matrix $R_{yy}$ in the frequency domain to calculate the output correlation matrix $R_{yy}(t_S)$ in the time domain.

The output correlation calculation unit 142 sets the initial output correlation matrix $R_{yy}$ in the frequency domain to a unit matrix, when the change state information indicating the switching state of a sound source or the change state information indicating the utterance state is input from the sound change detection unit 122.

The output correlation calculation unit 142 outputs the calculated or set correlation matrix $R_{yy}$ in the frequency domain to the separation error calculation unit 134 of the sound source separation unit 13 and outputs the output correlation matrix $R_{yy}(t_S)$ in the time domain to the window length calculation unit 143.

The window length calculation unit 143 calculates the window length $N(t_S)$ on the basis of the output correlation matrix $R_{yy}(t_S)$ in the time domain input from the output correlation calculation unit 142 and outputs the calculated window length $N(t_S)$ to the input correlation calculation unit 141.

The window length calculation unit 143 determines the window length on the basis of the reciprocal of the minimum separation sharpness as, for example, expressed by Equation 18.

$$N(t_S)=(\beta\cdot\min(E[y(t_S)y^*(t_S)-\mathrm{diag}(y(t_S)y^*(t_S))]))^{-2} \quad (18)$$

In Equation 18, min(a) represents the minimum value of a scalar value a and $\beta$ is a predetermined value indicating an allowable error parameter (for example, 0.99). Here, the window length calculation unit 143 sets the window length $N(t_S)$ to the maximum value $N_{max}$, when the calculated window length $N(t_S)$ is greater than a predetermined maximum value $N_{max}$ (for example, 1000 samples).

As the window length $N(t_S)$ calculated by the window length calculation unit 143 becomes larger, the estimation precision of the separation matrix W becomes higher but the adaption speed becomes lower. As described above, according to this embodiment, the window length calculation unit 143 can calculate a small window length to raise the adaptation speed when the convergence characteristic of the separation matrix W is poor, and can calculate a large window length to enhance the estimation precision when the convergence characteristic of the separation matrix W is excellent.

The sound output unit 15 performs the inverse discrete Fourier transform on the spectrum indicated by the output vector for each frequency input from the sound estimation unit 131 for each frame time to generate an output signal in the time domain. The sound output unit 15 outputs the generated output signal to the outside of the sound source separation apparatus 1.

A sound source separating process performed by the sound source separation apparatus 1 according to this embodiment will be described below.

Figure 2:
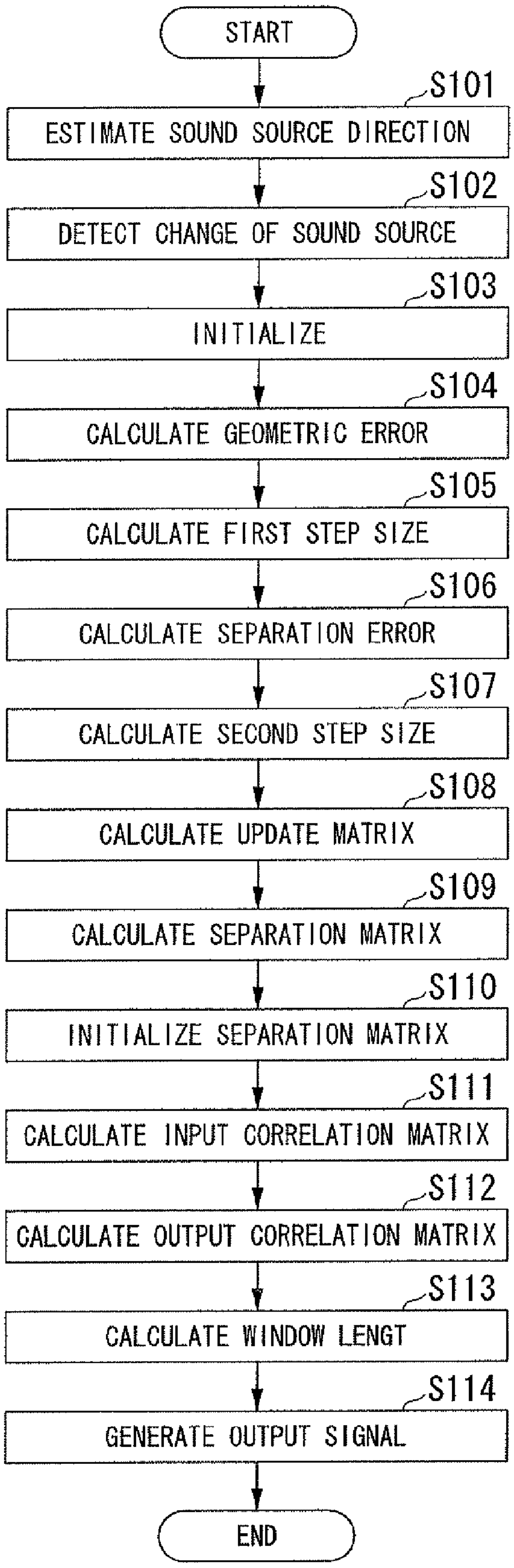
FIG. 2 is a flowchart illustrating a sound source separating process according to the embodiment of the invention.

FIG. 2 is a flowchart illustrating the sound source separating process according to this embodiment.

(step S101) The sound source localization unit 121 estimates a sound source direction on the basis of a multichannel sound signal input from the sound input unit 11 using, for example, the MUSIC method.

The sound source localization unit 121 outputs the sound source direction information indicating the estimated sound source direction to the sound change detection unit 122, the parameter selection unit 124, and the sound estimation unit 131. Thereafter, the process of step S102 is performed.

(step S102) The sound change detection unit 122 detects the change state of a sound source direction on the basis of the multichannel sound signal input from the sound input unit 11 and the sound source direction information input from the sound source localization unit 121 and generates the change state information indicating the detected change state.

Here, the sound change detection unit 122 generates the change state information indicating the switching state of a sound source direction when the sound source direction at the current frame time and the sound source direction at the frame time a frame ago are greater than a predetermined angle threshold $\theta_{th}$.

When the power of a sound signal is uniformly smaller than a predetermined threshold from a previous time a predetermined number of frames ago to the previous time a frame ago and the current power of the sound signal is greater than the threshold, the sound change detection unit 122 detects that the utterance state occurs. At this time, the sound change detection unit 122 generates the change state information indicating the utterance state.

The sound change detection unit 122 outputs the generated change state information to the parameter selection unit 124, the sound estimation unit 131, the input correlation calculation unit 141, and the output correlation calculation unit 142. Thereafter, the process of step S103 is performed.

(step S103) when the sound change detection unit 122 outputs the change state information indicating the switching state of a sound source direction or the utterance state, the sound source separation apparatus 1 initializes the separation matrix W and parameters for calculating the separation matrix. The specific process related to the initialization will be described later. Thereafter, the process of step S104 is performed.

(step S104) The geometric error calculation unit 132 calculates the matrix $E_{GC}$ on the basis of the transfer function matrix D input from the parameter selection unit 124 and the separation matrix W input from the sound estimation unit 131 using, for example, Equation 9 and calculates the geometric error matrix $J'_{GC}$ using, for example, Equation 8.

The geometric error calculation unit 132 outputs the calculated geometric error matrix $J'_{GC}$ to the first step size calculation unit 133 and the update matrix calculation unit 136 and outputs the calculated matrix $E_{GC}$ to the first step size calculation unit 133. Thereafter, the process of step S105 is performed.

(step S105) The first step size calculation unit 133 calculates the first step size $\mu_{GC}$ on the basis of the matrix $E_{GC}$ and the geometric error matrix $J'_{GC}$ input from the geometric error calculation unit 132 using, for example, Equation 10. The first step size calculation unit 133 outputs the calculated first step size $\mu_{GC}$ to the update matrix calculation unit 136. Thereafter, the process of step S106 is performed.

(step S106) The separation error calculation unit 134 calculates the matrix $E_{SS}$ on the basis of the output correlation matrix $R_{yy}$ input from the output correlation calculation unit 142 of the correlation calculation unit 14 using Equation 12. The separation error calculation unit 134 calculates the separation error matrix $J'_{SS}$ on the basis of the calculated matrix $E_{SS}$, the input correlation matrix $R_{xx}$ input from the correlation calculation unit 14, and the separation matrix W input from the sound estimation unit 131 using, for example, Equation 11.

The separation error calculation unit 134 outputs the calculated separation error matrix $J'_{SS}$ to the second step size calculation unit 135 and the update matrix calculation unit 136 and outputs the calculated matrix $E_{ss}$ to the second step size calculation unit 135. Thereafter, the process of step S107 is performed.

(step S107) The second step size calculation unit 135 calculates the second step size $\mu_{SS}$ on the basis of the matrix $E_{SS}$ and the separation error matrix $J'_{SS}$ input from the separation error calculation unit 134 using, for example, Equation 13.

The second step size calculation unit 135 outputs the calculated second step size $\mu_{SS}$ to the update matrix calculation unit 136. Thereafter, the process of step S108 is performed.

(step S108) The geometric error matrix $J'_{GC}$ from the geometric error calculation unit 132 and the separation error matrix $J'_{SS}$ from the separation error calculation unit 134 are input to the update matrix calculation unit 136. The first step size $\mu_{GC}$ from the first step size calculation unit 133 and the second step size $\mu_{SS}$ from the second step size calculation unit 135 are input to the update matrix calculation unit 136.

The update matrix calculation unit 136 weighted-sums the geometric error matrix J'GC and the separation error matrix J'SS by the use of the first step size $\mu_{GC}$ and the second step size $\mu_{SS}$ to calculate the update matrix ΔW for each frame. The update matrix calculation unit 136 outputs the calculated update matrix ΔW to the sound estimation unit 131. Thereafter, the process of step S109 is performed.

(step S109) The sound estimation unit 131 subtracts the update matrix ΔW input from the update matrix calculation unit 136 from the separation matrix W at the current frame time t to calculate the separation matrix W at the subsequent frame time t+1. The sound estimation unit 131 outputs the calculated separation matrix W to the geometric error calculation unit 132, the separation error calculation unit 134, and the output correlation calculation unit 142. Thereafter, the process of step S110 is performed.

(step S110) When the sound change information input from the sound change detection unit 122 indicates the switching of a sound source direction, the sound estimation unit 131 stores the previously-calculated separation matrix W as the optimal separation matrix $W_{opt}$ in its own storage unit and initializes the separation matrix W. The process of initializing the separation matrix W will be described later. Thereafter, the process of step S111 is performed.

(step S111) The input correlation calculation unit 141 calculates the instantaneous value $R^{(i)}_{xx}(t_S)$ of the input correlation matrix of the multichannel sound signal input from the sound input unit 11 for each sampling time $t_S$ on the basis of the window length $N(t_S)$ input from the window length calculation unit 143 using, for example, Equation 14.

The input correlation calculation unit 141 calculates the attenuation parameter $\alpha(t_S)$ on the basis of the window length $N(t_S)$ using, for example, Equation 16.

The input correlation calculation unit 141 calculates the input correlation matrix $R_{xx}(t_S)$ at the current sampling time on the basis of the calculated attenuation parameter $\alpha(t_S)$ and the instantaneous value $R^{(i)}_{xx}(t_S)$ of the input correlation matrix using, for example, Equation 15.

The input correlation calculation unit 141 outputs the input correlation matrix $R_{xx}(t_S)$ in the time domain calculated for each sampling time to the output correlation calculation unit 142 and outputs the input correlation matrix Rxx in the frequency domain to the separation error calculation unit 134 for each frame. Thereafter, the process of step S112 is performed.

(step S112) The output correlation calculation unit 142 calculates the output correlation matrix $R_{yy}(t_S)$ in the time domain on the basis of the input correlation matrix $R_{xx}(t_S)$ in the time domain input from the input correlation calculation unit 141 and the separation matrix W input from the sound estimation unit 131 using, for example, Equation 17.

The output correlation calculation unit 142 outputs the calculated output correlation matrix $R_{yy}(t_S)$ in the time domain to the window length calculation unit 143 and outputs the output correlation matrix $R_{yy}(t_S)$ in the frequency domain to the separation error calculation unit 134. Thereafter, the process of step S113 is performed.

(step S113) The window length calculation unit 143 calculates the window length $N(t_S)$ on the basis of the output correlation matrix $R_{yy}(t_S)$ input from the output correlation calculation unit 142 using, for example, Equation 18 and outputs the calculated window length $N(t_S)$ to the input correlation calculation unit 141. Thereafter, the process of step S114 is performed.

(step S114) The sound estimation unit 131 performs the discrete Fourier transform on the sound signal for each channel of the multichannel sound signal input from the sound input unit 11 to transform the sound signals into the frequency domain and calculates the input vector x for each frequency.

The sound estimation unit 131 multiplies the separation matrix W by the calculated input vector x to calculate the output vector y for each frequency. The sound estimation unit 131 outputs the output vector y to the sound output unit 15.

The sound output unit 15 performs the inverse discrete Fourier transform on the spectrum indicated by the output vector for each frequency input from the sound estimation unit 131 for each frame time to generate the output signal in the time domain. The sound output unit 15 outputs the generated output signal to the outside of the sound source separation apparatus 1. Thereafter, the flow of processes is ended.

The initialization process performed by the sound source separation apparatus 1 according to this embodiment will be described below.

Figure 3:
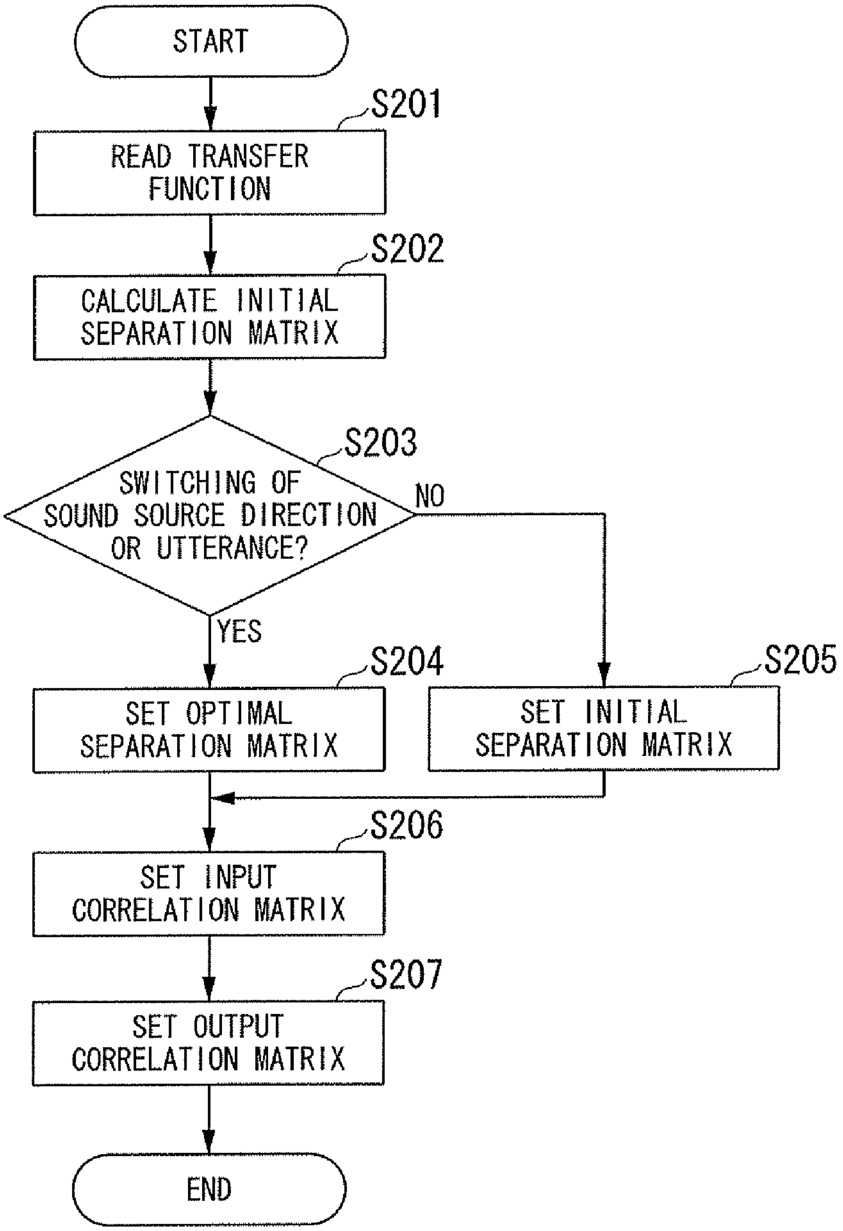
FIG. 3 is a flowchart illustrating an initialization process according to the embodiment of the invention.

FIG. 3 is a flowchart illustrating the initialization process according to this embodiment.

(step S201) When the change state information indicating the switching state of a sound source direction or the utterance state is input, the parameter selection unit 124 reads a transfer function vector corresponding to the sound source direction information indicating the sound source directions closest to the sound source directions indicated by the sound source direction information input from the sound source localization unit 121 from the transfer function storage unit 123. The parameter selection unit 124 constructs a transfer function matrix using the read transfer function vector and outputs the constructed transfer function matrix to the sound estimation unit 131 and the geometric error calculation unit 132. Thereafter, the process of step S202 is performed.

(step S202) The parameter selection unit 124 calculates the initial separation matrix $W_{init}$ on the basis of the constructed transfer function matrix using, for example, Equation 5 and outputs the calculated initial separation matrix $W_{init}$ to the sound estimation unit 131. Thereafter, the process of step S203 is performed.

(step S203) The sound estimation unit 131 determines whether one of the switching state of a sound source direction and the utterance state or both the switching state of a sound source direction and the utterance state are input from the sound change detection unit 122.

When the sound estimation unit 131 determines that one of the switching state of a sound source direction and the utterance state is input from the sound change detection unit 122 (YES in step S203), the process of step S204 is performed. When the sound estimation unit 131 determines that both the switching state of a sound source direction and the utterance state are input from the sound change detection unit 122 (NO in step S203), the process of step S205 is performed.

(step S204) The sound estimation unit 131 reads the optimal separation matrix $W_{opt}$ corresponding to the sound source direction information input from the sound source localization unit 121 from the storage unit and sets the read optimal separation matrix $W_{opt}$ as the separation matrix W. Thereafter, the process of step S206 is performed.

(step S205) The sound estimation unit 131 stores the previously-calculated separation matrix W as the optimal separation matrix $W_{opt}$ in the storage unit. The sound estimation unit 131 sets the initial separation matrix $W_{init}$ input from the parameter selection unit 124 as the separation matrix W. Thereafter, the process of step S206 is performed.

(step S206) When the change state information indicating the switching state of a sound source direction or the change state information indicating the utterance state is input from the sound change detection unit 122, the input correlation calculation unit 141 sets the initial input correlation matrix $R_{xx}$ to a unit matrix. Thereafter, the process of step S207 is performed.

(step S207) When the change state information indicating the switching state of a sound source direction or the change state information indicating the utterance state is input from the sound change detection unit 122, the output correlation calculation unit 142 sets the initial output correlation matrix $R_{yy}$ in the frequency domain to a unit matrix. Thereafter, the flow of processes related to the initialization is ended.

The result of speech recognition using an output signal acquired from the sound source separation apparatus 1 according to this embodiment will be described below. The sound source separation apparatus 1 is provided to a human robot and the sound input unit 11 is disposed in a head part of the robot. The output signal from the sound source separation apparatus 1 is input to a speech recognition system. The speech recognition system employs a missing feature theory based automatic speech recognition (MFT-ASR). A speech corpus of Japanese Newspaper Article Sentences (JNAS) is used as an acoustic model for the speech recognition. The corpus includes speech data of 60 minutes or more.

In Experiment 1 (Ex. 1), two speakers are made to utter 236 words included in a word database of the speech recognition system for each word, and a word correct rate in isolated word recognition is checked. Therefore, in this experiment, two speakers serve as sound sources, two sound sources represent that two speakers simultaneously utter sound, and a single sound source represents that one of two speakers utters sound.

The utterance positions of the speakers in Experiment 1 will be described below.

Figure 4:
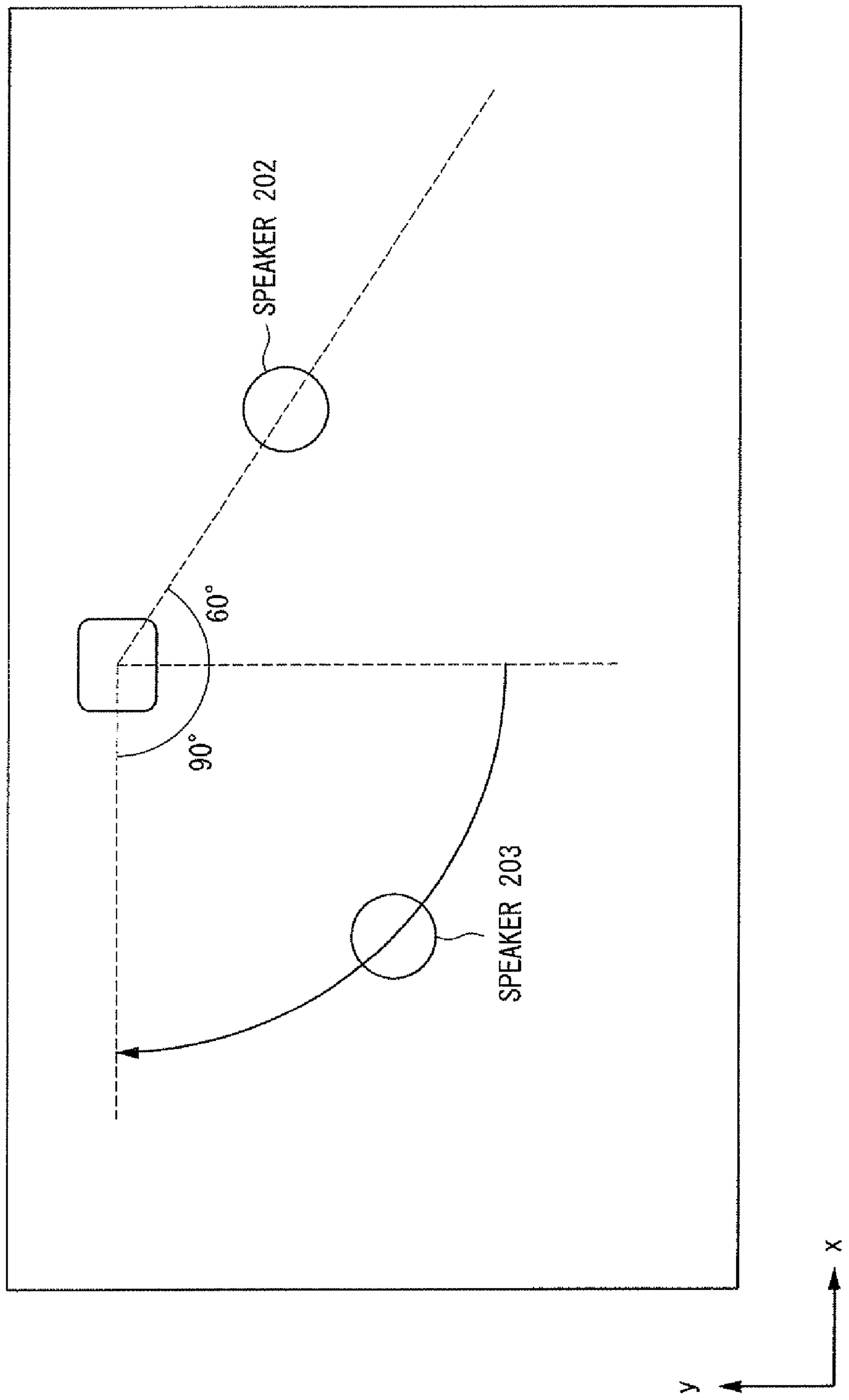
FIG. 4 is a conceptual diagram illustrating an example of an utterance position of an utterer.

FIG. 4 is a conceptual diagram illustrating an example of the utterance positions of the speakers.

In FIG. 4, the horizontal direction is defined as the x direction and the vertical direction is defined as the y direction.

As shown in FIG. 4, in Experiment 1, the robot 201 sets its front side to the minus (−) y direction and is stopped without generating any sound. One speaker 202 utters sound in a state where the speaker is stopped on the left side by 60° about the front side of the robot 201. The other speaker 203 utters sound while moving from the front side (0°) of the robot to the right side by −90°. Here, the sound source separation apparatus 1 is made to operate in any one operation mode of three operation modes of a geometric sound separation (GSS) mode, an adaptive step size (AS) mode, and an AS-optima controlled recursive average (OCRA) mode.

In the GSS mode, the step sizes $\mu_{GC}$ and $\mu_{SS}$ are fixed to a predetermined value without activating the first step size calculation unit 133 and the second step size calculation unit 135, and the window length N(t) is fixed without activating the window length calculation unit 143 of the correlation calculation unit 14.

In the AS mode, the first step size calculation unit 133 and the second step size calculation unit 135 are activated to sequentially calculate the step sizes $\mu_{GC}$ and $\mu_{SS}$ and the window length N(t) is fixed without activating the window length calculation unit 143 of the correlation calculation unit 14.

In the As-OCRA mode, the first step size calculation unit 133 and the second step size calculation unit 135 are activated to calculate the step sizes $\mu_{GC}$ and $\mu_{SS}$ and the window length calculation unit 143 of the correlation calculation unit 14 is activated to sequentially calculate the window length N(t).

An example of the word correct rate according to this embodiment will be described below.

FIG. 5 is a diagram illustrating an example of the word correct rate according to this embodiment.

In FIG. 5, the word correct rates in the GSS mode, the AS mode, and the AS-OCRA mode are shown sequentially from the third column, and a stopped speaker and a moving speaker in the case of a single sound source and a stopped speaker and a moving speaker in the case of two sound sources are shown sequentially from the uppermost row.

As shown in FIG. 5, comparing the stopped speaker with the moving speaker, the word correct rates are the same regardless of the operation modes and the numbers of sound sources. Comparing the GSS mode, the AS mode, and the AS-OCRA mode with each other, the word correct rate in the GSS mode is the lowest and the word correct rate in the AS-OCRA mode is the highest. However, the difference in word correct rate between the AS mode and the AS-OCRA mode is smaller than that between the GSS mode and the AS mode. As can be seen from the results shown in FIG. 5, the sound sources can be effectively separated by introducing the AS mode, thereby improving the word correct rate.

Comparing the numbers of sound sources with each other, the word correct rate in a single sound source is higher than that in two sound sources. When the number of sound sources is one in the GSS mode, the recognition rate is 90% or more. This shows that the sound source can be effectively separated when the number of sound sources is one (for example, in an environment including relatively small noise). Even when the number of sound sources is two, the word correct rate can be improved by introducing the AS mode or the AS-OCRA mode.

In Experiment 2 (Ex. 2), 10 speakers are made to utter 50 sentences selected from the ASJ phonetically—balanced Japanese sentence corpus. In this case, a word accuracy is checked in Experiment 2. The word accuracy Wa is defined using Equation 19.

$$W\alpha=(Num-Sub-Del-Ins)/Num \tag{19}$$

In Equation 19, Num represents the number of words uttered by a speaker, Sub represents the number of substitution errors. The substitution error means that a word is substituted with a word other than the uttered word. Del represents the number of deletion errors. The deletion error means that a word is actually uttered but is not recognized. Ins represents the number of insertion errors. The insertion error means that a word not actually uttered appears in the recognition result. In Experiment 2, the word accuracy is collected for each switching pattern of the separation matrix. Here, for the purpose of comparison, the results in the case where transfer functions sequentially calculated on the basis of the phases from a sound source to a sound input element is used instead of the transfer function selected by the parameter selection unit 124 are collected.

The utterance position of a speaker in Experiment 2 will be described below.

Figure 6:
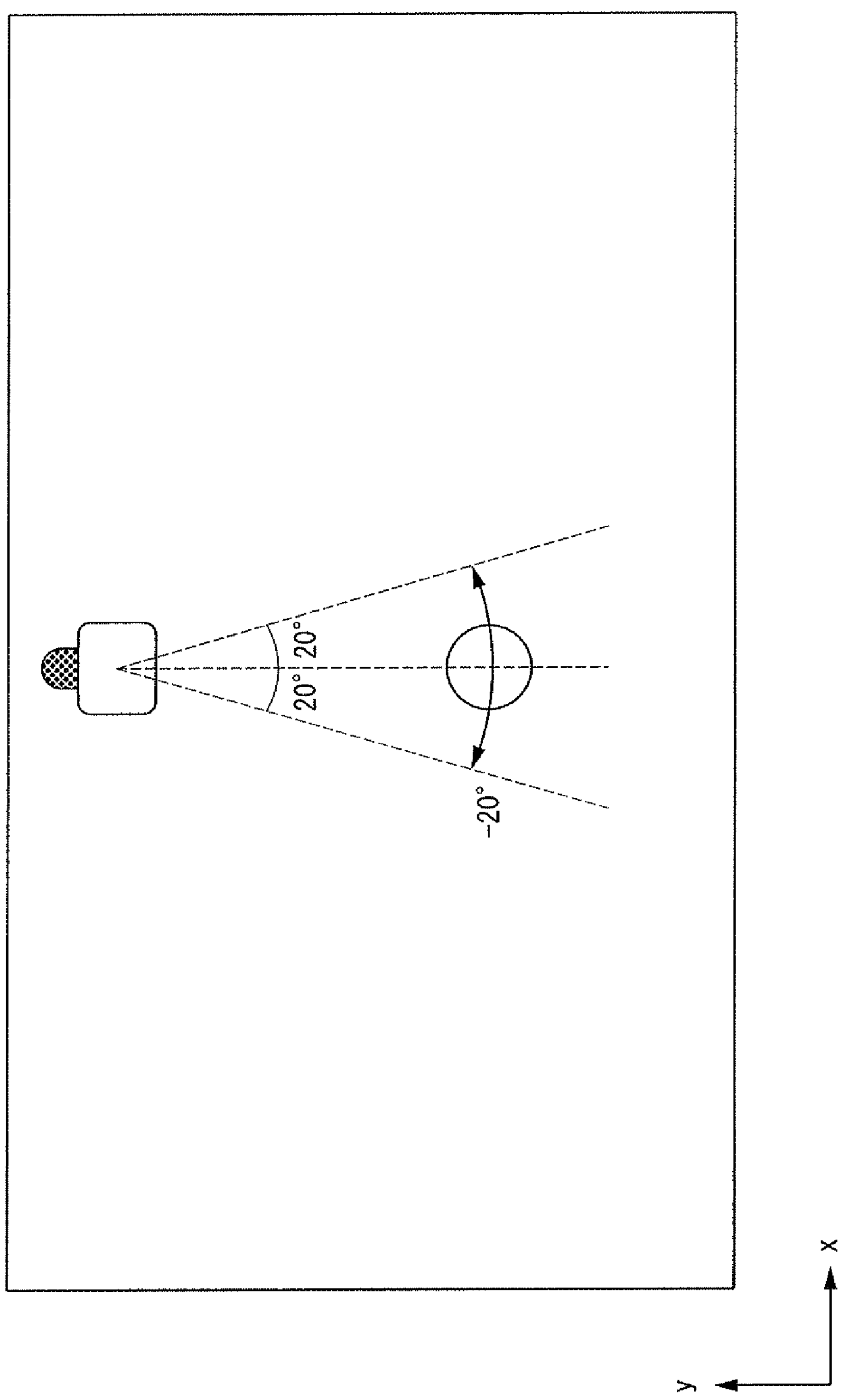
FIG. 6 is a conceptual diagram illustrating another example of the utterance position of the utterer.

FIG. 6 is a conceptual diagram illustrating another example of the utterance positions of a speaker.

In FIG. 6, the horizontal direction is defined as the x direction and the vertical direction is defined as the y direction. In FIG. 6, the robot 201 is made to act while setting its front side to the minus (−) y direction. At this time, the robot 201 generates ego-noise based on its action from the rear side.

As shown in FIG. 6, in Experiment 2, a speaker 204 utters sound while stopping on the front side of the robot 201. Alternatively, the speaker 204 utters sound while moving between the position of −20° on the front-right side of the robot and the position of 20° on the front-left. Here, the sound source separation apparatus 1 is made to operate in the AS-OCRA mode.

An example of the word accuracy according to this embodiment will be described below.

FIG. 7 is a diagram illustrating an example of the word accuracy according to this embodiment.

In FIG. 7, the word accuracies in stop and movement are shown sequentially from the third column. The stop means that a speaker utters sound while stopping. The movement means that a speaker utters sound while moving.

The leftmost column shows the switching modes of the transfer function, that is, any one of the input change state information, such as the switching state of a sound source direction (POS) and the utterance state (ID), and the case (CALC) where the transfer function is calculated by the parameter selection unit 124 as described above. The second column shows the switching modes of the separation matrix W, that is, any one case where the sound estimation unit 131 initializes the separation matrix W on the basis of the input change state information such as the switching state of a sound source direction (POS), the utterance state (ID), and both the switching state of a sound source direction and the utterance state (ID_POS).

It can be seen from FIG. 7 that when the separation matrix W based on the switching state of a sound source direction or the utterance state is initialized, the word accuracy is significantly improved, compared with the case where the transfer function is calculated as described above. In this embodiment, it can be seen that the word accuracy is relatively small in dependency on the switching modes of the transfer function or the switching modes of the separation matrix W. That is, the estimation of the separation matrix W by the sound source separation apparatus 1 according to this embodiment follows the movement of a sound source.

In the case of the switching mode of the separation matrix W in ID, when a speaker is moving, the word accuracy is higher than that in the other switching modes. When the speaker stops, the word accuracy is lower than that in the other switching modes. Accordingly, when the sound source does not markedly move, it is preferable that the sound estimation unit 131 sets the separation matrix W using the optimal separation matrix $W_{opt}$ rather than the initial separation matrix $W_{init}$. When the sound source moves, it is preferable that the sound estimation unit 131 sets the separation matrix W using the initial separation matrix $W_{init}$.

In this manner, according to this embodiment, the change state information indicating the change of a sound source is generated on the basis of the input signal, the transfer function is read on the basis of the generated change state information, the initial separation matrix is calculated using the read transfer function, and a sound source is separated from the input signal using the calculated initial separation matrix.

Accordingly, since the initial separation matrix is used to separate a sound source using the transfer function read on the basis of the change of the sound source, it is possible to separate the sound signal in spite of the change of the sound source.

According to this embodiment, the separation matrix used to separate a sound source from the input signal is sequentially updated, it is determined whether the separation matrix converges on the basis of the amount of update of the separation matrix, the separation matrix is stored when it is determined that the separation matrix converges, and the stored separation matrix instead of the initial separation matrix is set as an initial separation matrix.

Accordingly, when the separation matrix converges, the separation matrix which previously converges is used instead of the initial separation matrix, whereby the convergence of the separation matrix is maintained even after the separation matrix is set. As a result, it is possible to separate the sound signal with high precision.

According to this embodiment, it is detected as the change state information that a sound source direction is switched to be greater than a predetermined threshold, and the information indicating the switching of the sound source direction is generated.

Accordingly, it is possible to set the initial separation matrix on the basis of the switching of a sound source direction.

According to this embodiment, it is detected as the change state information that the amplitude of the input signal is greater than a predetermined threshold, and the information indicating that the utterance has started is generated.

Accordingly, it is possible to set the initial separation matrix on the basis of the start of utterance.

According to this embodiment, the cost function based on at least one of the separation sharpness indicating the degree to which a sound source is separated as another sound source and the geometric constraint function indicating the magnitude of an error between the output signal and the sound source signal is used as an index value.

Accordingly, it is possible to reduce the degree to which components based on different sound sources are mixed as a single sound source or the separation error.

According to this embodiment, the cost function obtained by weighted-summing the separation sharpness and the geometric constraint function.

Accordingly, it is possible to reduce the degree to which components based on different sound sources are mixed as a single sound source and to reduce the separation error.

A part of the sound source separation apparatus 1 according to the above-mentioned embodiment, such as the sound source localization unit 121, the sound change detection unit 122, the parameter selection unit 124, the sound estimation unit 131, the geometric error calculation unit 132, the first step size calculation unit 133, the separation error calculation unit 134, the second step size calculation unit 135, and the update matrix calculation unit 136, the input correlation calculation unit 141, the output correlation calculation unit 142, and the window length calculation unit 143 may be embodied by a computer. In this case, the part may be embodied by recording a program for performing the control functions in a computer-readable recording medium and causing a computer system to read and execute the program recorded in the recording medium. Here, the "computer system" is built in the speech recognition apparatuses 1 and 2 and the speech recognition robot 3 and includes an OS or hardware such as peripherals. Examples of the "computer-readable recording medium" include memory devices of portable mediums such as a flexible disk, a magneto-optical disc, a ROM, and a CD-ROM, a hard disk built in the computer system, and the like. The "computer-readable recording medium" may include a recording medium dynamically storing a program for a short time like a transmission medium when the program is transmitted via a network such as the Internet or a communication line such as a phone line and a recording medium storing a program for a predetermined time like a volatile memory in a computer system serving as a server or a client in that case. The program may embody a part of the above-mentioned functions. The program may embody the above-mentioned functions in cooperation with a program previously recorded in the computer system.

In addition, part or all of the sound source separation apparatus 1 according to the above-mentioned embodiments may be embodied as an integrated circuit such as an LSI (Large Scale Integration). The functional blocks of the musical score position estimating apparatuses 1 and 2 may be individually formed into processors and a part or all thereof may be integrated as a single processor. The integration technique is not limited to the LSI, but they may be embodied as a dedicated circuit or a general-purpose processor. When an integration technique taking the place of the LSI appears with the development of semiconductor techniques, an integrated circuit based on the integration technique may be employed.

While preferred embodiment of the invention have been described and illustrated above, it should be understood that these are exemplary of the invention and are not to be considered as limiting. Additions, omissions, substitutions, and other modifications can be made without departing from the spirit or scope of the present invention. Accordingly, the invention is not to be considered as being limited by the foregoing description, and is only limited by the scope of the appended claims.

What is claimed is:

1. A sound source separation apparatus comprising:

a processor programmed with instructions that, when executed, cause the processor to:

generate change state information indicating a change of a sound source on the basis of an input signal input from a sound input unit;

calculate-an initial separation matrix on the basis of the generated change state information; and separate-the sound source from the input signal input from the sound input unit using the initial separation matrix, and to update the separation matrix using a cost function based on at least one of a separation sharpness indicating a degree of separation of a sound source from another sound source and a geometric constraint function indicating a magnitude of error between an output signal and a sound source signal as an index value.

2. The sound source separation apparatus according to claim 1, further comprising a non-transitory storage medium holding a transfer function from the sound source, and wherein the processor is further programmed with instructions that, when executed, cause the processor to read the transfer function from the storage medium and calculate the initial separation matrix using the read transfer function.

3. The sound source separation apparatus according to claim 1, wherein the processor is further programmed with instructions that, when executed, cause the processor to detect as the change state information that a sound source direction changes to be greater than a predetermined threshold and to generate information indicating the change of the sound source direction.

4. The sound source separation apparatus according to claim 1, wherein the processor is further programmed with instructions that, when executed, cause the processor to detect as the change state information that the amplitude of the input signal changes to be greater than a predetermined threshold and to generate information indicating that utterance has started.

5. The sound source separation apparatus according to claim 1, wherein the processor is further programmed with instructions that, when executed, cause the processor to use a cost function obtained by weighted-summing the separation sharpness and the geometric constraint function as the cost function.

6. A sound source separation method in a sound source separation apparatus having a transfer function storage unit storing a transfer function from a sound source, the sound source separation method comprising:

causing the sound source separation apparatus to generate change state information indicating a change of the sound source on the basis of an input signal input from a sound input unit;

causing the sound source separation apparatus to calculate an initial separation matrix on the basis of the generated change state information; and causing the sound source separation apparatus to separate the sound source from the input signal input from the sound input unit using the calculated initial separation matrix, and to update the separation matrix using a cost function based on at least one of a separation sharpness indicating a degree of separation of a sound source from another sound source and a geometric constraint function indicating a magnitude of error between an output signal and a sound source signal as an index value.

* * * * *